US012679589B2

(12) United States Patent
Windsor et al.

(10) Patent No.: US 12,679,589 B2
(45) Date of Patent: Jul. 14, 2026

(54) REUSABLE RECYCLABLE THERMOFORMED SHIPPING CONTAINERS

(71) Applicant: P.R.A. Company, Standish, MI (US)

(72) Inventors: Shawn J. Windsor, Whittemore, MI (US); Paul R. Aultman, Coleman, MI (US)

(73) Assignee: P.R.A. Company, Standish, MI (US)

( * ) Notice: Subject to any disclaimer, the term of this patent is extended or adjusted under 35 U.S.C. 154(b) by 745 days.

(21) Appl. No.: 18/101,540

(22) Filed: Jan. 25, 2023

(65) Prior Publication Data

US 2023/0227198 A1 Jul. 20, 2023

Related U.S. Application Data

(62) Division of application No. 16/665,802, filed on Oct. 28, 2019, now Pat. No. 11,603,228.

(60) Provisional application No. 62/913,617, filed on Oct. 10, 2019.

(51) Int. Cl.
| | |
|---|---|
| *B65D 1/24* | (2006.01) |
| *B29C 41/20* | (2006.01) |
| *B29C 51/12* | (2006.01) |
| *B29C 51/30* | (2006.01) |
| *B65D 71/70* | (2006.01) |
| *B29C 51/00* | (2006.01) |
| *B65D 1/48* | (2006.01) |
| *B65D 51/12* | (2006.01) |

(52) U.S. Cl.
CPC .............. B65D 1/243 (2013.01); B29C 41/20 (2013.01); B29C 51/12 (2013.01); B29C 51/30 (2013.01); B65D 71/70 (2013.01); *B29C 51/002* (2013.01); *B65D 1/48* (2013.01); *B65D 51/12* (2013.01); *B65D 2501/2435* (2013.01)

(58) Field of Classification Search
None
See application file for complete search history.

(56) References Cited

U.S. PATENT DOCUMENTS

| | | | | | |
|---|---|---|---|---|---|
| 199,746 | A | * | 1/1878 | Ricklefsen | ......... B65D 21/0215 217/24 |
| 3,120,901 | A | * | 2/1964 | Boyd | ................... B65D 85/322 206/520 |
| 3,489,124 | A | * | 1/1970 | Cannon | ................ A01K 41/065 220/23.6 |
| 3,817,215 | A | * | 6/1974 | Levin | ................... A01K 41/065 119/347 |
| 3,896,239 | A | * | 7/1975 | Peters | ...................... B65D 1/36 426/119 |
| 3,958,711 | A | * | 5/1976 | Morris | ................... B65D 71/70 206/509 |
| 4,410,099 | A | * | 10/1983 | deLarosiere | ............. B65D 1/36 220/519 |
| 4,899,874 | A | * | 2/1990 | Apps | ...................... B65D 71/70 206/427 |
| 5,115,937 | A | * | 5/1992 | Chausse | ................ B65D 71/70 220/519 |

(Continued)

*Primary Examiner* — Emmanuel S Luk

(74) *Attorney, Agent, or Firm* — Mitchell Intellectual Property Law, PLLC

(57) ABSTRACT

A thermoformed, reusable, recyclable shipping container comprising a thermoformed shell and a plurality of separate load bearing columns secured within said shell at various locations whereby the stacking load imposed on the containers will be at least partially borne by the load bearing columns.

21 Claims, 14 Drawing Sheets

(56)          References Cited

U.S. PATENT DOCUMENTS

| | | | |
|---|---|---|---|
| 5,426,890 A * | 6/1995 | Dummen | A01G 9/0295 |
| | | | 47/87 |
| 6,749,065 B1 * | 6/2004 | Hammett | B65D 21/0233 |
| | | | 220/519 |
| 2006/0147588 A1 * | 7/2006 | Garwood | B65B 7/164 |
| | | | 426/392 |
| 2008/0156684 A1 * | 7/2008 | Xzomenia | A47B 87/0215 |
| | | | 206/505 |
| 2014/0197065 A1 * | 7/2014 | Prince | B65D 21/0213 |
| | | | 206/503 |
| 2022/0073233 A1 * | 3/2022 | Kondo | B29C 44/569 |

* cited by examiner

REUSABLE RECYCLABLE THERMOFORMED SHIPPING CONTAINERS

CLAIM OF PRIORITY

This application claims priority to application Ser. No. 62/913,617, filed Oct. 10, 2019, and entitled REUSABLE RECYCLABLE THERMOFORMED SHIPPING CONTAINERS, and claims the benefit of U.S. application Ser. No. 16/665,802, filed Oct. 28, 2019, entitled REUSABLE RECYCLABLE THERMOFORMED SHIPPING CONTAINERS, which is allowed.

FIELD OF THE INVENTION

Thermoformed plastic shipping containers, e.g. "dunnage" or trays.

BACKGROUND OF THE INVENTION

Thermoformed plastic shipping containers are typically a less expensive alternative to injection molded shipping containers or trays (see Prior Art FIG. 1). They are formed by heating a plastic sheet to a pliable condition and forming it on a mold to give it its desired shape. (1PA)

Stacking is typically required of shipping containers (see Prior Art FIGS. 2, 3). Injection molded containers become more competitive where the stacking loads imposed on the containers are higher. For loads of 3,000 pounds or more, injection molded containers or trays are typically used because of their greater strength and stacked compression resistance.

The stacking strength of the containers is obtained through their geometry and the thickness and strength of the plastic used to thermoform the walls. To facilitate stacking, stacking features are thermoformed into the containers, at thicknesses and shapes designed to bear the weight of the product loaded containers stacked on top of them. Heavier load requirements usually also result in increased wall thicknesses for the containers.

The stacking features of thermoformed containers typically include load bearing support platforms 2 and non-linear walls 3 thermoformed into the container, often formed in mirror image from one side of the container to the other, such that successively stacked containers can be arranged so that the non-linear walls cross each other in the stack (see Prior Art FIGS. 1-3). The stacking features thermoformed into the containers restrict the area available for product packing. In addition, the higher load requirements require thicker walls to increase wall strength. Both of these requirements are drawbacks economically.

SUMMARY OF THE INVENTION

The present invention is a thermoformed, reusable, recyclable shipping container comprising a thermoformed shell and a plurality of separate load bearing columns secured within said shell at various locations whereby the stacking load imposed on the containers will be at least partially borne by the load bearing columns. As a result of this invention, the thermoformed shells themselves can be formed of thinner plastic than containers having integrally formed stacking features. Further, the containers of the present invention can be made sufficiently strong so as to compete with injection molded shipping containers which are typically required for heavier load applications. The reduction or elimination of thermoformed stacking features means the containers have more storage space for products.

These and other objects, features and advantages of the invention will be more fully understood with reference to the drawings, description of the preferred embodiments and claims of the specification.

DESCRIPTION OF THE PREFERRED EMBODIMENTS

Parts List

Figure 1:
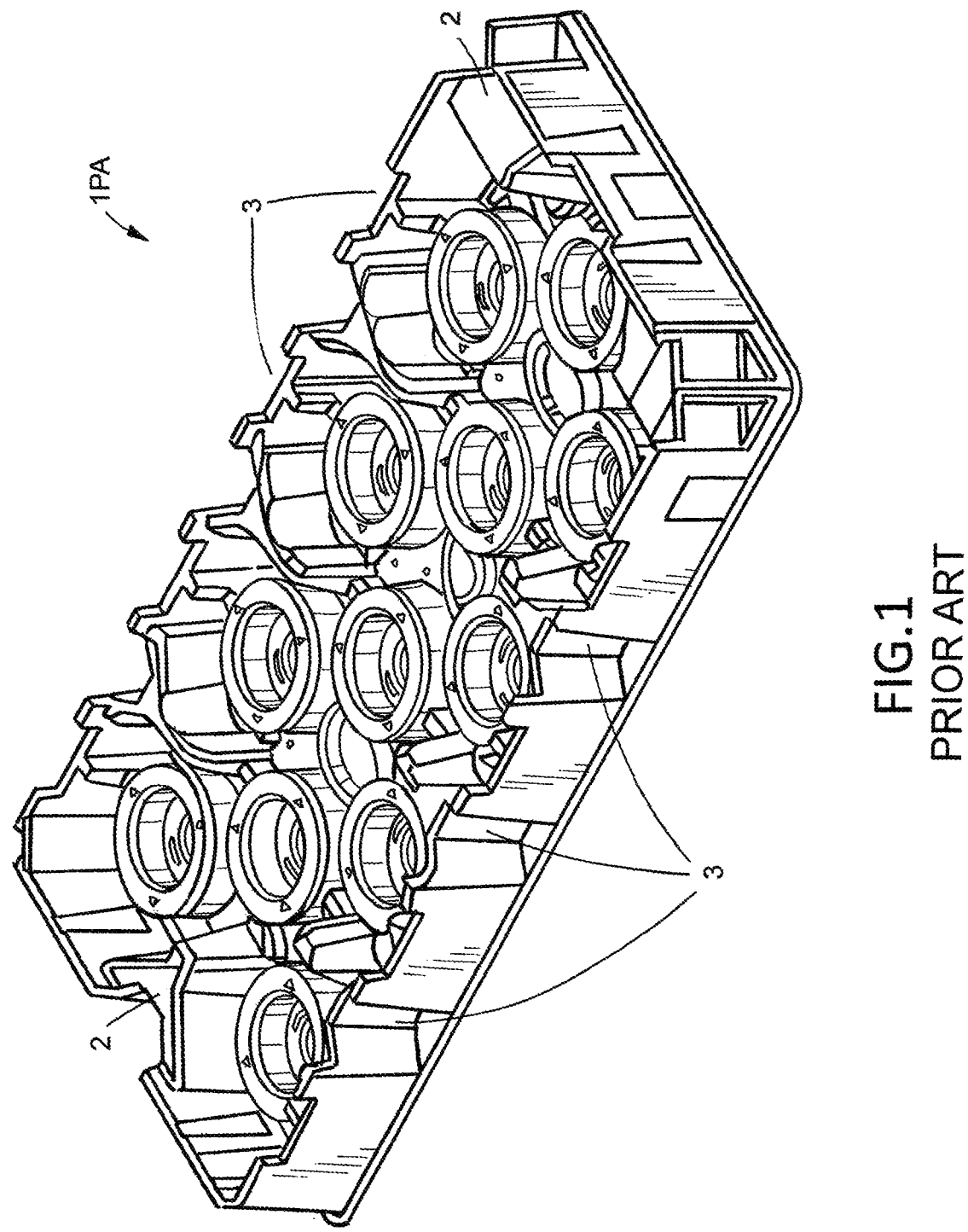
FIG. 1 is a perspective view of a prior art thermoformed shipping container.
Figure 2:
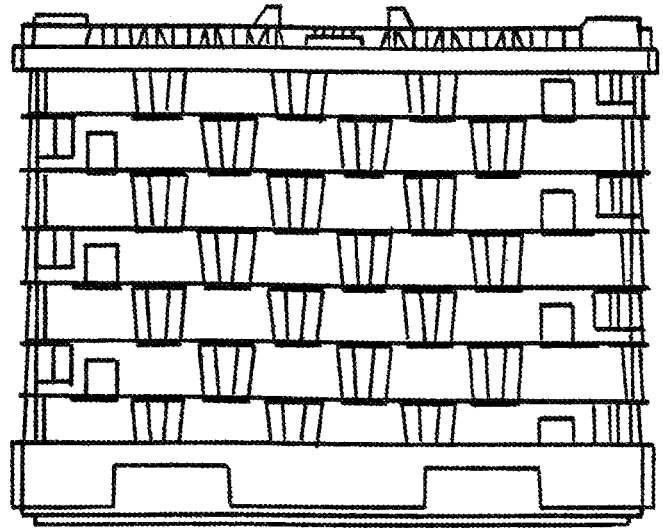
FIG. 2 is a side elevation of a stack of the prior art containers of FIG. 1.
Figure 3A:
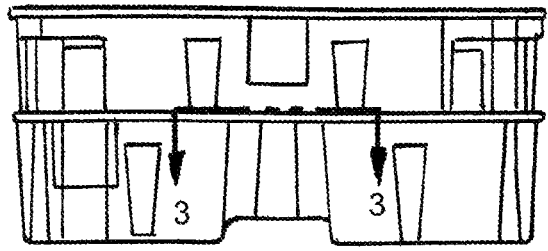
FIG. 3A is an illustration of the way the walls of the prior art containers of FIGS. 1 and 2 stacked on top of one another.
Figure 3B:
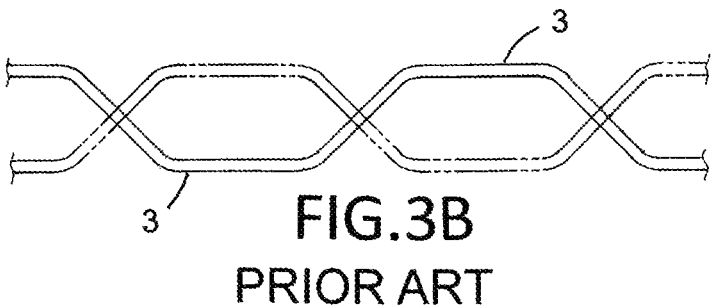
FIG. 3B is a cross section taken as indicated in FIG. 3A.

The numerical designations for the various parts discussed in the preferred embodiment are as follows:

1 The preferred embodiment thermoformed, reusable, recyclable shipping container
 10 thermoformed shells
  11 walls
  12 wall fusions
  13 ribs
  14 shorter ribs
  15 part-wells
  16 auxiliary wells
 20 load bearing columns
  21 retainer grooves
  22 formed top well.
 30 The thermoforming die for the preferred embodiment container
  31 spindles for supporting columns 31a holder well for holding columns
32 mold walls over which shell walls are formed
33 gaps between prongs and mold walls to facilitate fusion
34 rib walls
35 shorter rib walls
36 wells for forming part holding wells
40 Alternative embodiment column
  41 inner column wall
  42 inner column ribs
50 Alternative embodiment column
  51 stem
  52 funnel shaped top
  53 insertion base
  53a beveled edge on base 53
100 Alternative embodiment shell
  111 short walls In the preferred embodiment, the thermoformed, reusable, recyclable shipping container 1 comprises a thermoformed shell 10 and a plurality of separate load bearing columns 20 secured within the interior of shell 10 at various locations whereby the stacking load imposed on the containers will be at least partially borne by the load bearing columns (FIGS. 4-6 and 6A). This type of container is often referred to as a "tray." To form container 1, the columns 20 are inserted over spindles 31 and down into column holder wells 31a in thermoplastic mold 30 (FIG. 10), such that shell 10 is thermoformed around, columns 20. As viewed from above (FIGS. 5, 6), columns 20 are sheathed in the thermoplastic material of shell 10. As viewed from the bottom of shell 10 (FIG. 4; see also FIG. 9, with an alternative column 40), the columns are unsheathed.

Preferably, columns 20 are located at least at the corners of container 1. Additional support is provided by locating several columns 20 in the interior of the space defined by the perimeter wells. Similarly, additional support is provided by locating columns 20 along the length of the perimeter walls between the corners thereof. Preferably, columns 20 are located in and along the length of shell walls 11, or in ribs 13 or 14, or at the junction thereof. Preferably, columns 20 are located in containers 1 so as to bear most, more preferably substantially all, or most preferably all of the stacking load placed on pallets 1. In the preferred embodiment container 1 shown in the drawings, there are columns 20 at each of the four corners of the container, two more in each of the four walls 11 of the container, and four located within the interior space defined by the perimeter walls, at the junction of interior ribs 13 and 14.

Each column 20 is sufficiently long to extend to the top of the formed container 1. By extending from bottom to top of container 1, columns 20 serve as load bearing members on a container 1. One may also extend the length of columns 20 to slightly above the level of the tops of perimeter walls 11, and/or slightly below the level of the bottom of perimeter walls 11.

Figure 10:
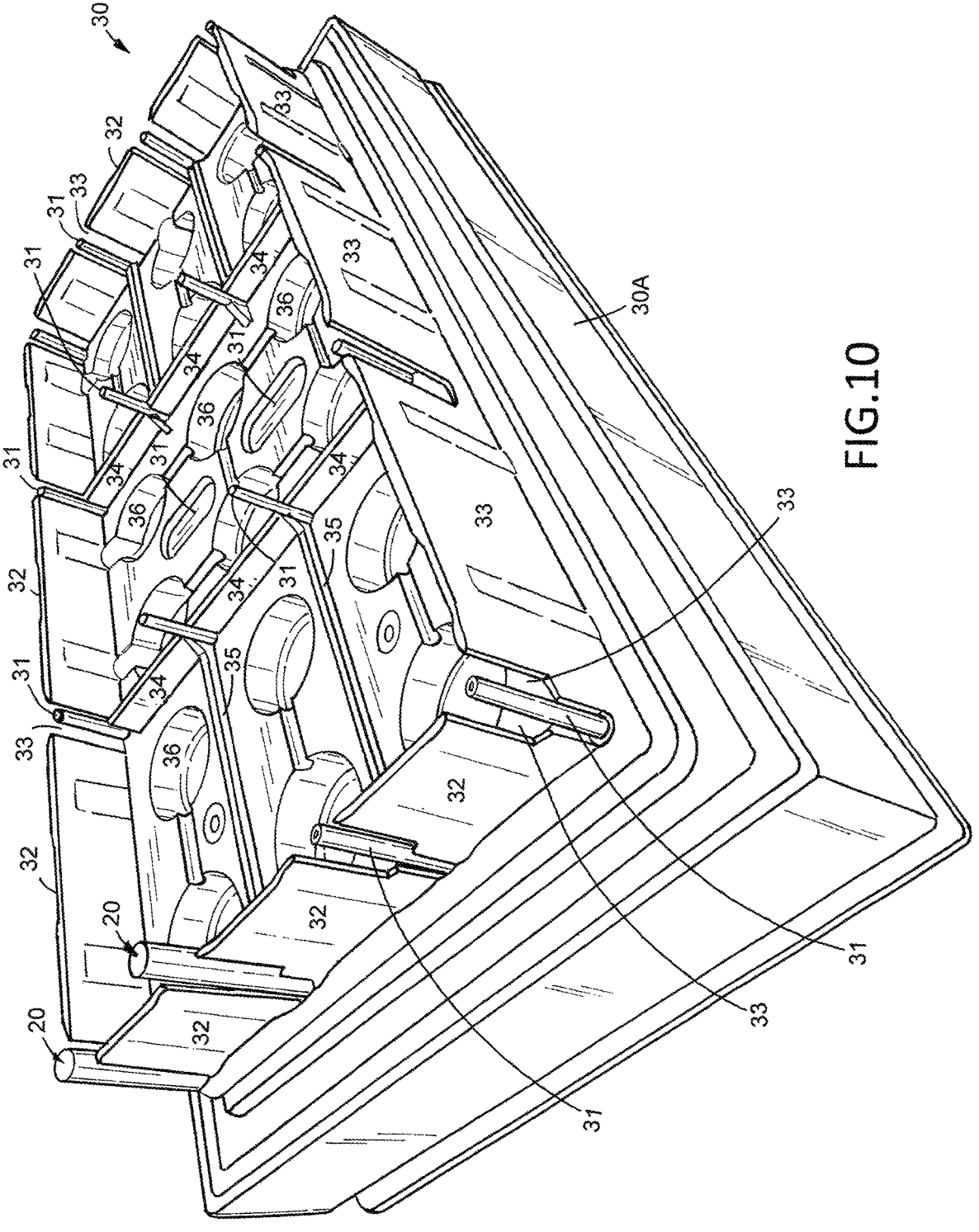
FIG. 10 is perspective view of a mold used to thermoform the preferred embodiment shipping container.

Shell 10 is thermoformed over mold 30 with columns 20 inserted over spindles 31 and down into column holder wells 31a located in the mold where the columns are to go (FIG. 10). Column holder wells 31a are the primary holder for the load bearing columns 20 during the molding process. Each of the holder wells 31a extends downwardly into mold 30 sufficiently far that its bottom is located at what will be the bottom of container 1 formed on mold 30. In this way, columns 20 will rest on any surface underlying a formed container 1. The thermoforming process used can be, without, limitation, vacuum forming, pressure forming, compression forming and twin sheet forming, etc.

Figure 11:
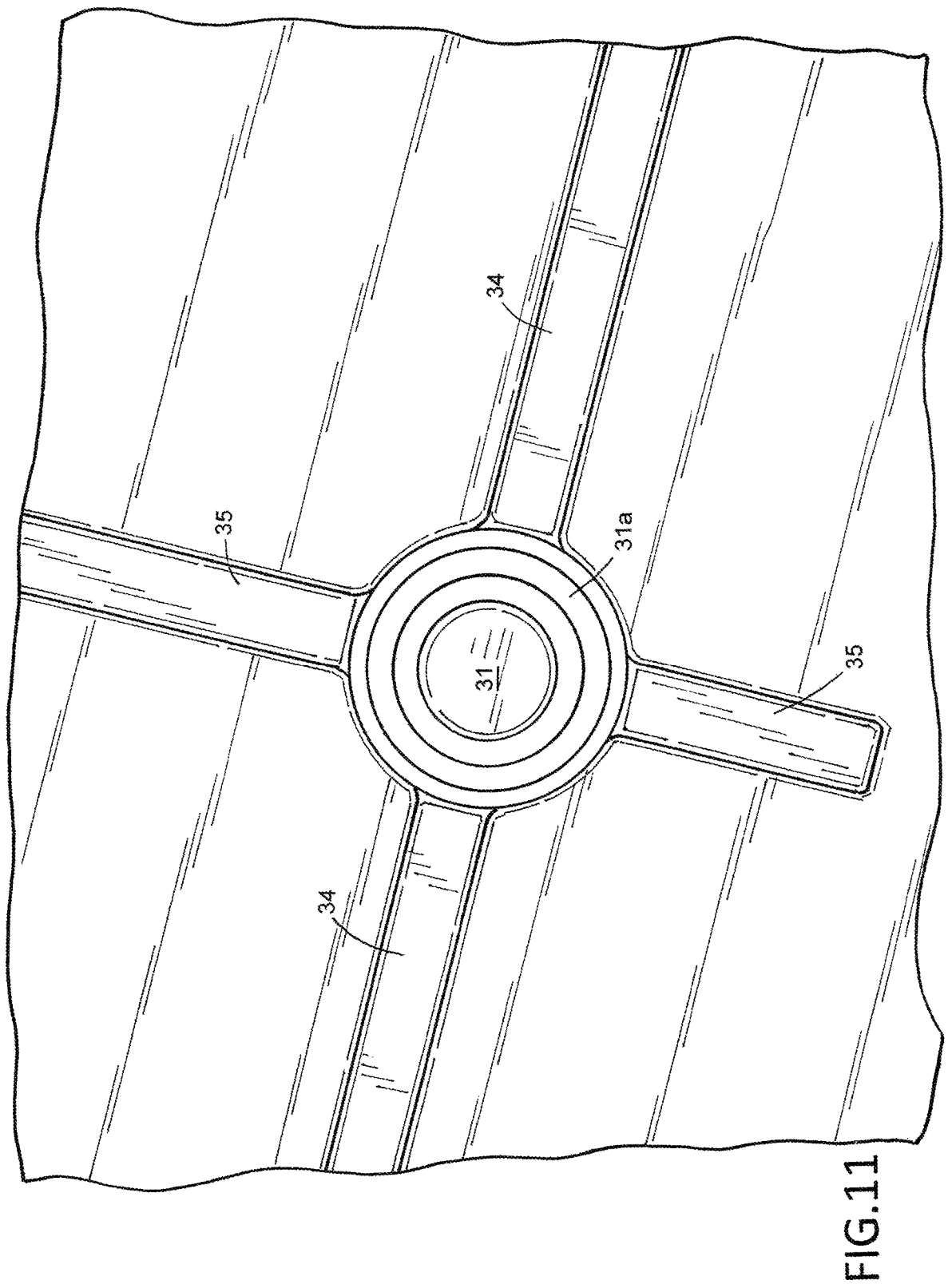
FIG. 11 is a close up of a support column receiver in the mold of FIG. 10.

All of the spindles 31 project upwardly from the interior of a column holder well 31a in mold 30 (FIG. 11). Spindles 31 tend to stabilize columns 20 during the molding process. FIG. 11 shows such a spindle and column holder well arrangement at a juncture of ribs 34 and 35. In this way, columns 20 sit over spindles 31 and down into wells 31a when the mold 30 is set up for thermoforming.

Figure 4:
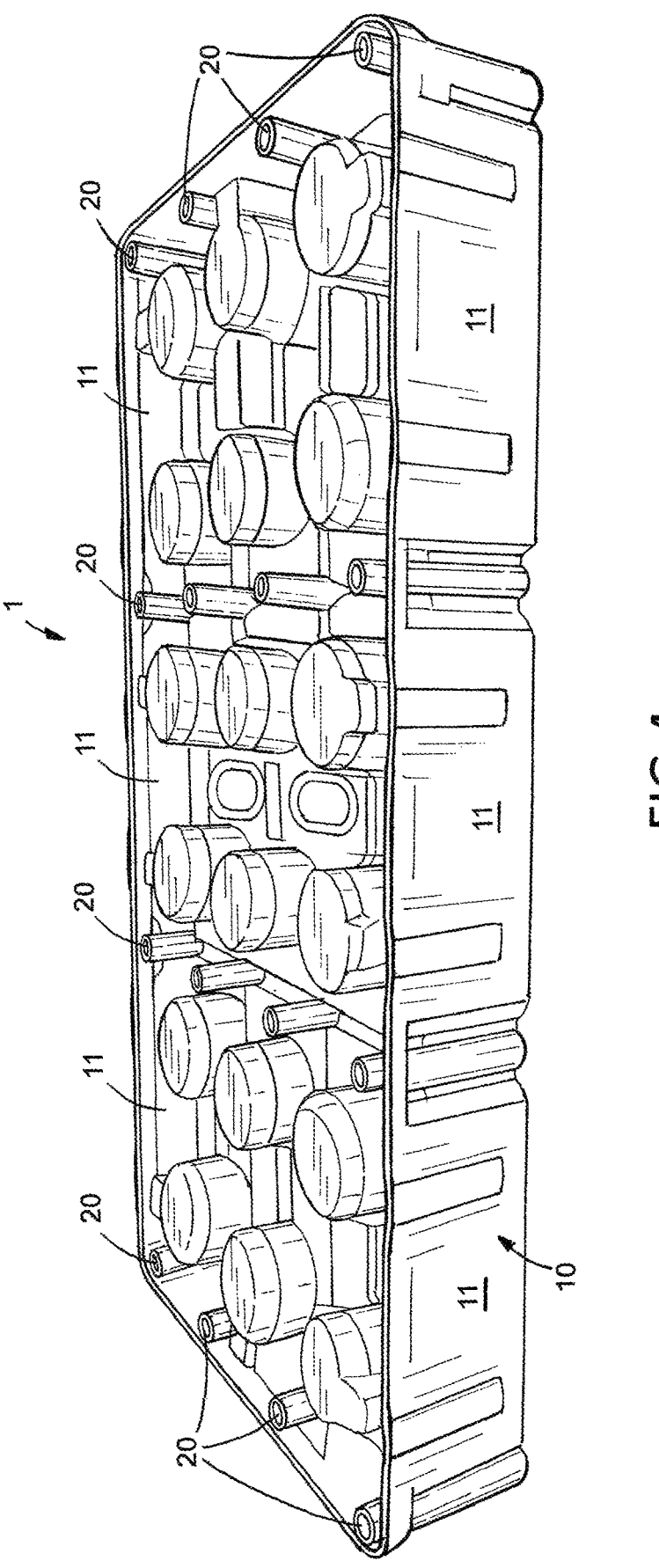
FIG. 4 is a bottom perspective view of a preferred embodiment thermoformed shipping container of the present invention.
Figure 5:
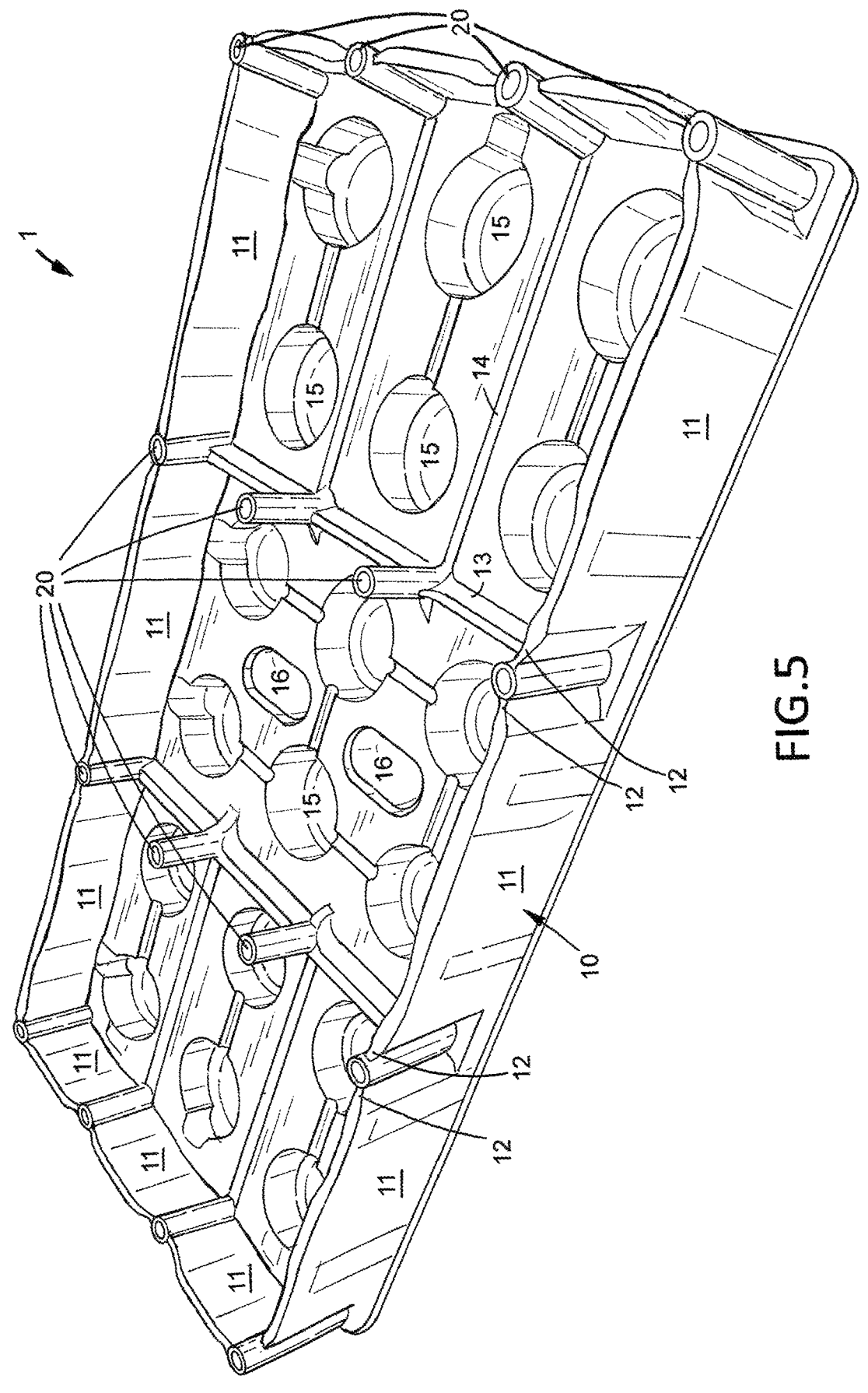
FIG. 5 is an upper perspective view of the preferred embodiment thermoformed shipping container.
Figure 6:
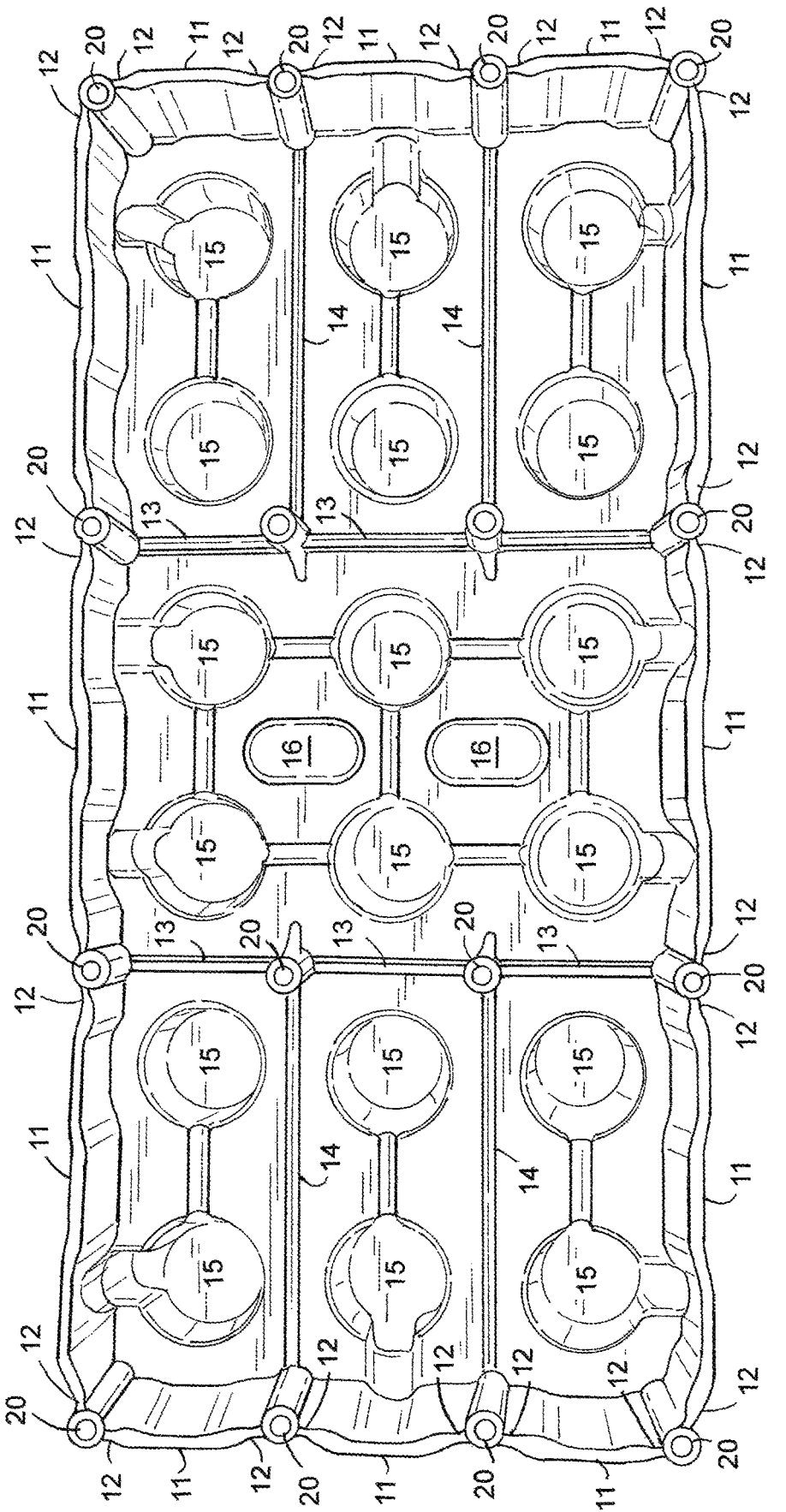
FIG. 6 is a top perspective view of the preferred embodiment thermoformed shipping container.
Figure 6A:
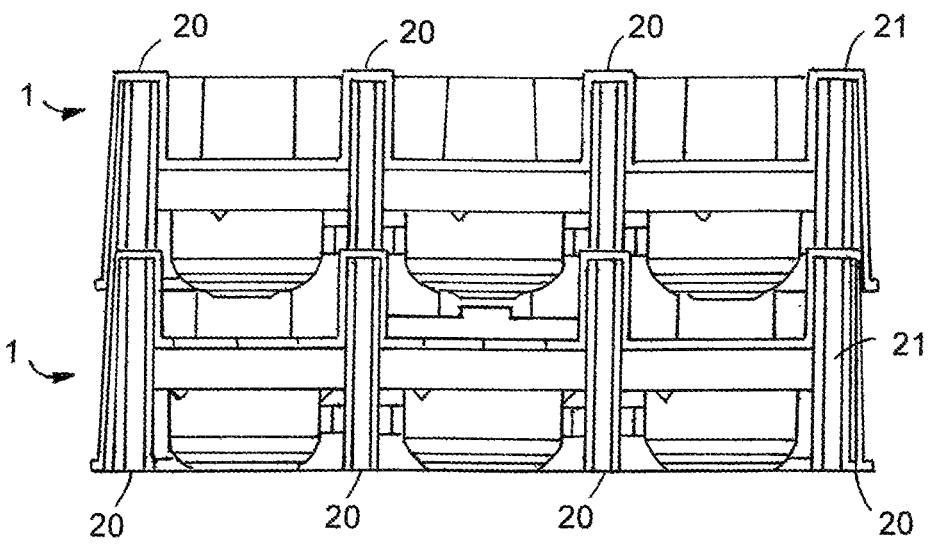
FIG. 6A is a cross sectional view of a stack of two preferred embodiment containers.

As can be seen from FIG. 10, there are 16 spindles 31 and holder wells 31a for 16 columns 20 (FIGS. 4-6). Shell 10 is thermoformed from a heated sheet, of any of the generally used thermoplastics, e.g. ABS, HIPS, HDPE, PVC, PET and PETG. In the preferred embodiment, PE or HDPE is used. The thickness of thermoplastic sheet used depends on the desired container strength and to some extent height of the container to be formed. Thicknesses may range from 0.045 to 0.500 inches. The resulting trays typically range from 1 inch to 30 inches in height.

Mold 30 includes a base 30a, the spindles 31 and wells 31a upon and into which columns 20 are positioned for the thermoforming process, and a plurality of spaced perimeter mold walls 32, over which the walls 11 of shell 10 are formed. Spindles 31 and column holder wells 31a are located in the space between the ends of spaced mold walls 32, such that columns 20 become part of shell walls 11 when shell 10 is thermoformed. The mold 30 also includes lateral mold ribs 34, which are shorter than perimeter walls 32, over which ribs 13 of shell 10 are formed (compare 10 to FIGS. 5, 6). Shorter longitudinal mold ribs 35 form shorter ribs 14 in shell 10. Spindles 31 and column holder wells 31a are placed at the junction of mold ribs 34 and 35 such that columns 20 are reinforced by shell ribs 13 and 14 when formed. Wells 36 in mold 30 form product containing wells 15 in shell 10. A pair of auxiliary mold wells 17 form auxiliary wells 16 in shell 10.

Figure 7:
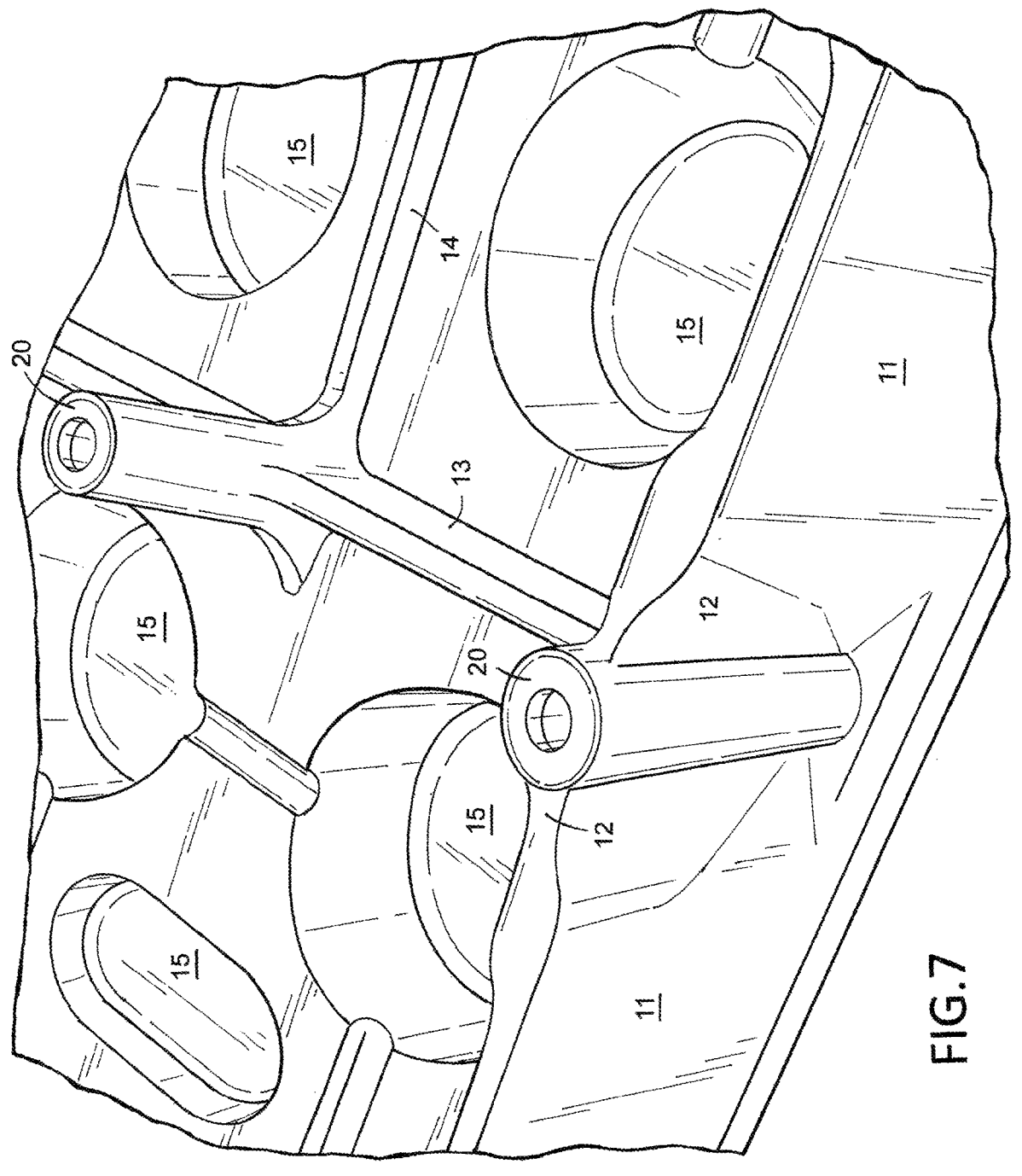
FIG. 7 is a close-up perspective view of a supporting column thermoformed into the preferred embodiment shipping container.

In addition, mold walls 31 are spaced apart lengthwise sufficiently far to create a gap 33 between the end of each mold wall 32 a column 20 placed in each column holder well 31a and over each spindle 31. While mold walls 31 form segments of wall 11 which are hollow between two faces formed on opposite sides of mold walls 32, gap 33 permits the opposite faces of wall 11 to fuse together in gaps 33. These fused wall portions 12 form on either side of a column 20 and further reinforce and stiffen each column 20 (see FIGS. 5-7).

Columns 20 are made of a stiff rigid material. They can be metal, composite or made of any of the plastics normally used in thermoforming. Preferably, they are made of the same material as shell 10, such that upon expiration of its useful life, each shipping and storage container 1 can be reground as a unit, with it shell and columns still together, rather than having to separate the columns from the shells.

Figure 8:
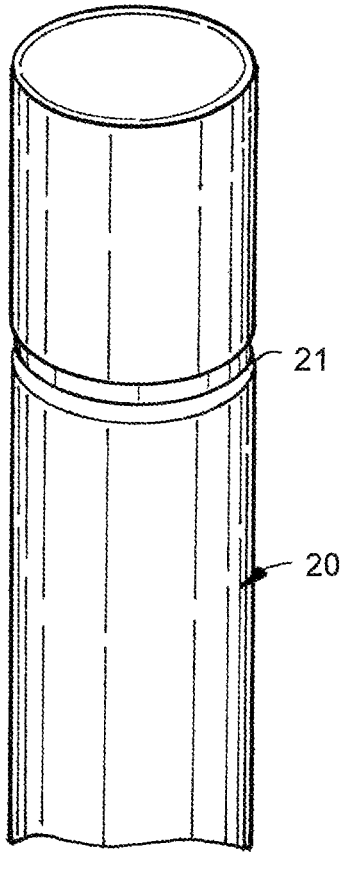
FIG. 8 is a close up of a preferred embodiment support column.

Columns 20 in the preferred embodiment are tubular in construction, though other shapes can be used. Preferably, columns 20 include a retainer feature, such as groove 21 near the top thereof (FIG. 8), such that plastic from the heated sheets during thermoforming tends to flow into grooves 21 and help lock columns 20 in place in the formed shell 10. The open top of each column causes a column top well 22 to form in the top of each column when it becomes sheathed in the plastic of the thermoformed shell 10 formed over it.

When stacked (FIG. 6A), the columns 20 in each of the stacked containers 1 line up with one another so that the weight of the successively stacked trays 1 is at least partially borne by the columns 20, rather than by the shell walls or other shell parts. The tops and bottoms of successive columns 20 can be provided with interlocking features to help keep the columns 20 in alignment. To some extent, top wells 22 perform this function when engaged by the bottom of the column 20 above it.

The present invention makes it possible to design shipping containers which carry more parts than correspondingly dimensioned prior art containers. There are two reasons for this. First, there is no need to mold stacking features into the container as was required for prior art containers. The outside dimensions of prior art container 1PA and the preferred embodiment container 1 are identical. Yet the preferred embodiment container 1 has eighteen product container wells vs. twelve for the prior art container 1PA. A second reason more parts can be carried is that the compression strength of the preferred embodiment container 1 is greater than that of prior art containers, since the columns bear most, if not substantially all of the stacking weight, rather than the container walls. More parts per container exert more compression weight on the containers below. Finally, the present invention enables a thermoformed container to carry heavier parts.

Comparative Example

In this comparative example, prior art container 1PA and preferred embodiment 1 were made to the same exterior directions for containing the same parts. The packed weight of each prior art tray was 1990 pounds and, because the preferred embodiment tray held more parts, 2387 pounds for preferred embodiment tray 1. The prior art tray was made of a sheet of 50-50 virgin-regrind HDPE, only the prior art tray was formed from thicker material, 0.350 inch vs. 0.200 inch for the preferred embodiment tray.

A stack of three half trays for each type was tested under compression for one hour. The protocol used to determine the compression load placed on each stack is based on the weight of four "packs." A pack includes one pallet, 10 loaded trays, and 2 unloaded trays and a cover. Since we were testing a stack of three half trays, the load used was half the weight of four "packs."

For the prior art tray, this compression load was 3980 pounds. For the preferred embodiment tray this load would have been 4774 pounds. That is greater than the load for the prior art trays since each preferred embodiment tray holds eight more parts, each having a significant weight. However, for this comparison, we subjected the preferred embodiment stack of trays to an even greater weight, namely 5664 pounds.

The compression platen used is a "floating" platen, such that it seeks out the weakest point in the stack of trays. The results were measured in the deflection in the height of the stack at its weakest point. The results obtained are as follows:

|  | Prior art | Preferred Embodiment |
|---|---|---|
| Sheet thickness | .350 in. | .200 in. |
| Compression load | 3980 lbs. | 5664 lbs. |
| Deflection | 1.355 in. | .318 in. |

Thus thermoformed plastic trays made in accordance with this invention will support a significantly higher compression load, carry more parts per tray, and can be made of thinner plastic sheet material.

Alternative Embodiments

Figure 9:
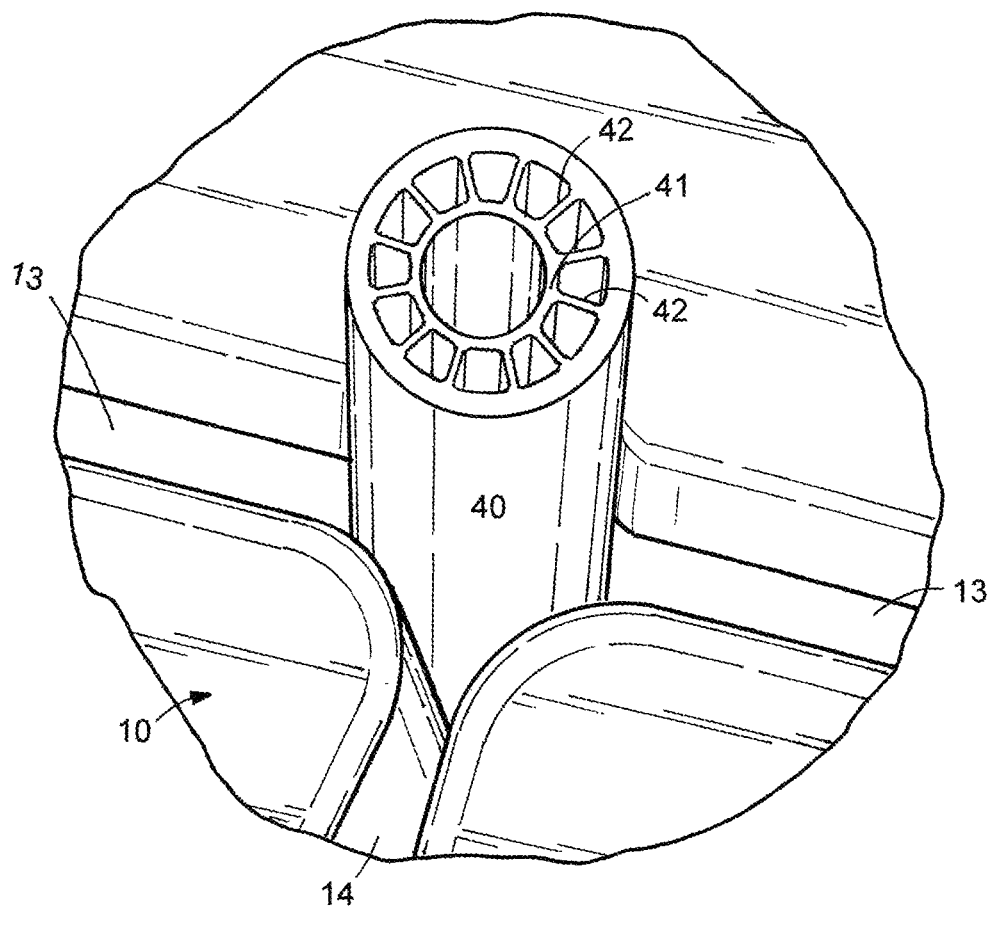
FIG. 9 is a close up of an alternative preferred embodiment support column projecting from the bottom of the container.

The column 40 used in FIG. 9 is an alternative embodiment. It is tubular like column 20 but is stiffer in that it, has an inner tubular wall 40 connected to the interior face of the outer tubular wall by reinforcing webs 42.

Figure 12:
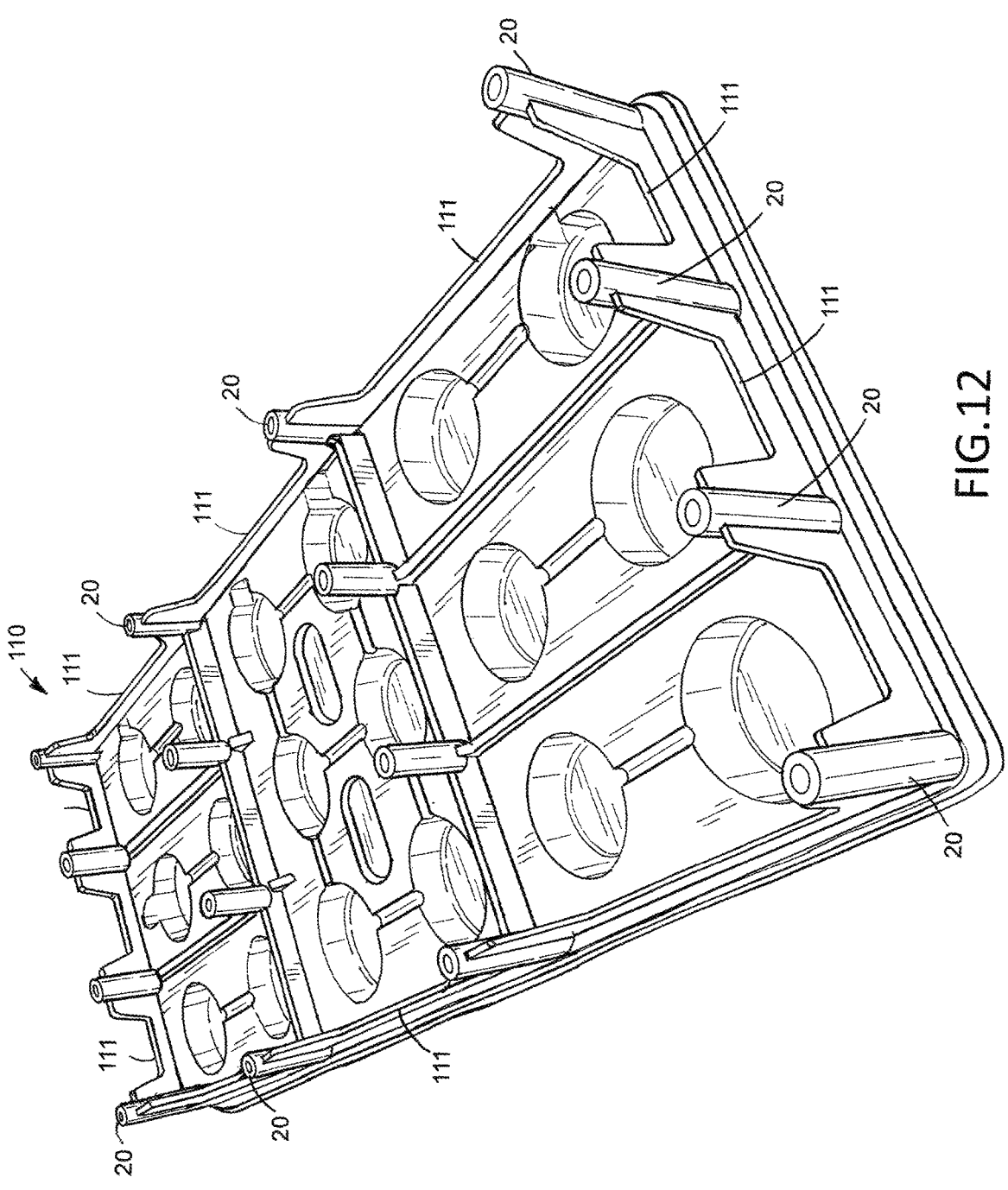
FIG. 12 is an upper perspective view of an alternative embodiment of the thermoformed shipping container of the present invention, in which the perimeter walls are formed with recessed portions to save material, without sacrificing strength.

FIG. 12 shows an alternative embodiment container 1A This design takes advantage of the added strength provided by columns 20 by reducing the height of exterior shell walls 111. This results in a cost saving without significantly sacrificing strength.

Figure 13:
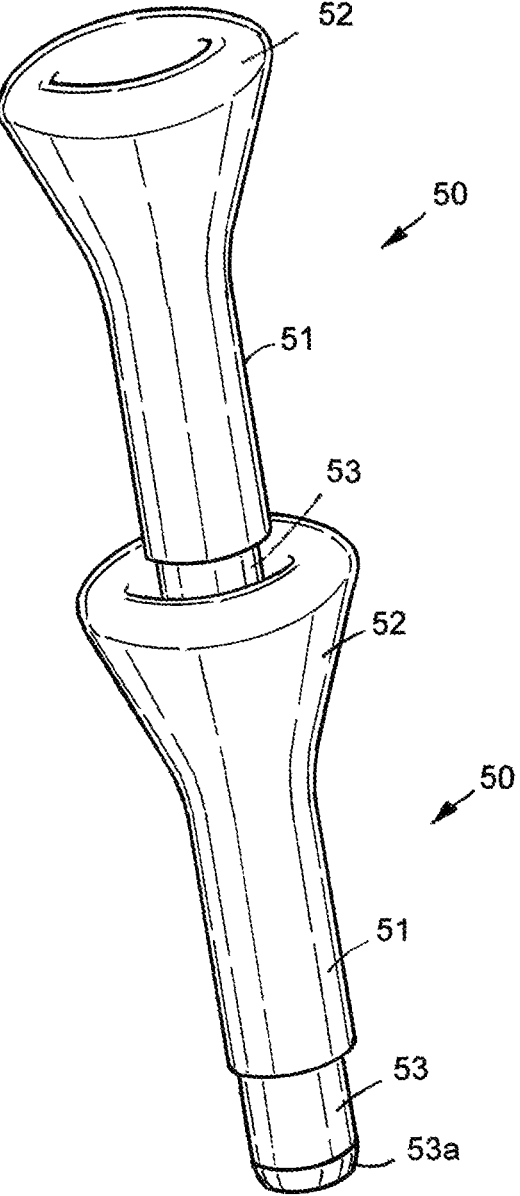
FIG. 13 is a front perspective view of two alternative embodiment columns, with one stacked on top of the other in a coupled manner.

FIG. 13 is a front perspective view of two alternative embodiment columns 50, with one stacked on top of the other in a coupled manner. Each column 50 includes a stem 51, a funnel shaped top 52, and an insertion base 53, which is narrower than stem 51 so that it can be inserted into the funnel 52 of a lower column 50 to facilitate ease of locating and stacking of one column on top of another. A beveled edge 53a on the bottom of insertion base 53 facilitates the insertion process.

An alternative method of manufacturing the container would be to mold the shell without placing columns in the mole. The shells would be formed separately with receiving sleeves into which the columns would be inserted and retained by press fit, adhesive or the like.

CONCLUSION

As a result of this invention, the thermoformed shells themselves can be formed of thinner plastic than containers having integrally formed stacking features. Further, the containers of the present invention can be made sufficiently strong so as to compete with injection molded shipping containers which are typically required for heavier load applications. The reduction or elimination of thermoformed stacking features means the containers have more storage space for products.

Of course, it is understood that the forgoing are preferred embodiments of the invention, and that various changes and modifications thereof can be made without departing from the breadth and spirit of the invention.

The invention claimed is:

1. A method of forming a stackable container comprising:
providing a mold configured to provide shape to a container shaped thermoplastic shell; including in said mold a plurality of holder wells for vertical columns for the container thermoformed on said mold; each of said holder wells extending to what will be the bottom of a container formed on said mold; positioning vertical columns in said holder wells and thermoforming a plastic sheet over said mold and said vertical columns.

2. The method of claim 1 comprising: each of said holder wells including a spindle extending upwardly from within said holder well; whereby vertical columns having a hollow interior can be placed over said spindles as well as being positioned within said holder wells.

3. The method of claim 2 comprising: providing said mold with a plurality of spaced perimeter mold walls over which the perimeter walls of a container are thermoformed by thermoforming said plastic sheet over said mold and said unconnected perimeter walls; said holder wells being positioned between the ends of said spaced perimeter walls, such that said vertical columns can be thermoformed into said container perimeter walls by thermoforming said plastic sheet over said mold and said perimeter walls formed on said mold; said perimeter mold walls being spaced apart lengthwise sufficiently to create a gap between the end of each perimeter mold wall and a vertical column placed in a holder well, whereby when a container perimeter wall is formed over said perimeter mold walls, it has spaced opposite faces except in said gaps, where said opposed faces are drawn together and fuse during the thermoforming process.

4. The method of claim 3 comprising: using vertical columns having retainer features whereby when said thermoforming step is performed, the heated plastic of said thermoformed container will tend to engage said retainer features during formation of said container, thereby securing said columns within said container.

5. The method of claim 4 in which: said mold is provided with interior ribs within the space defined by said perimeter walls; at least some column holder wells being positioned in said interior ribs; positioning vertical columns in said holder wells in said ribs, whereby at least some of said columns are positioned in and projecting upwardly from container interior ribs formed over said interior mold ribs.

6. The method of claim 5 in which the vertical columns used are made of the same plastic material as the plastic sheet which is thermoformed over said mold and said vertical columns.

7. The method of claim 1 comprising: providing said mold with a plurality of spaced perimeter mold walls over which the perimeter walls of a stackable container are thermoformed; column holder wells being positioned between said spaced perimeter walls, such that vertical columns can be thermoformed into the container perimeter walls formed on said mold; said perimeter mold walls being spaced apart lengthwise sufficiently to create a gap between the end of each perimeter mold wall and a column placed in a holder well, whereby when a container perimeter wall is formed over said perimeter mold walls, it has spaced opposite faces except in said gaps, where said opposed faces are drawn together and fuse during the thermoforming process.

8. The method of claim 7 comprising: using vertical columns having retainer features whereby when said thermoforming step is performed, the heated plastic of said thermoformed container will tend to engage said retainer features during formation of said container, thereby securing said columns within said container.

9. The method of claim 1 in which the vertical columns used are made of the same plastic material as the plastic sheet which is thermoformed over said mold and said load bearing columns.

10. The method of claim 1 comprising: using vertical columns having retainer features whereby when said thermoforming step is performed, the heated plastic of said thermoformed container will tend to engage said retainer features during formation of said container, thereby securing said columns within said container.

11. The method of claim 1 comprising: providing said mold with a plurality of spaced perimeter mold walls over which the perimeter walls of a container are thermoformed in said thermoforming step; said spaced perimeter walls being spaced apart sufficiently to create gaps in which column holder wells are positioned; placing vertical columns in said column holder wells in said gaps such that vertical columns positioned in said column holder wells in said gaps and being connected thereby can be thermoformed into said container during said thermoforming step.

12. The method of claim 11 in which: said mold is provided with interior ribs within the space defined by said perimeter walls; at least some column holder wells being positioned in said interior ribs; positioning vertical columns in said holder wells in said ribs, whereby at least some of said columns are positioned in and projecting upwardly from container interior ribs formed over said interior mold ribs.

13. The method of claim 12 comprising: using vertical columns having retainer features whereby when said thermoforming step is performed, the heated plastic of said thermoformed container will tend to engage said retainer features during formation of said container, thereby securing said columns within said container.

14. The method of claim 13 comprising: each of said holder wells including a slot extending upwardly on opposite sides from within said holder well; whereby vertical columns having at least a rib located on the outside of column; extending upwardly on opposite sides can be placed in said slot as well as being positioned within said holder wells.

15. The method of claim 14 in which the vertical columns used are made of the same plastic material as the plastic sheet which is thermoformed over said mold and said vertical columns.

16. The method of claim 1 in which: said mold is provided with interior ribs within the space defined by said perimeter walls; at least some column holder wells being positioned in said interior ribs; positioning vertical columns in said holder wells in said ribs, whereby at least some of said columns are positioned in and projecting upwardly from container interior ribs formed over said interior mold ribs.

17. The method of claim 16 comprising: using vertical columns having retainer features whereby when said thermoforming step is performed, the heated plastic of said thermoformed container will tend to engage said retainer features during formation of said container, thereby securing said columns within said container.

18. The method of claim 1 comprising: each of said holder wells including a slot extending upwardly on opposite sides from within said holder well; whereby vertical columns having at least a rib located on the outside of column extending upwardly on opposite sides can be placed in said slot as well as being positioned within said holder wells.

19. The method of claim 17 comprising: using vertical columns having retainer features whereby when said thermoforming step is performed, the heated plastic of said thermoformed container will tend to engage said retainer features during formation of said container, thereby securing said columns within said container.

20. A method of forming a stackable container comprising:

provoiding a mold configured to provide shape to a container shaped thermoplastic shell;

including in said mold a plurality of holder wells to receive upstanding vertical columns for the container thermoformed on said mold; each of said holder wells extending to what will be the bottom of a container formed on said mold; positioning the upstanding vertical columns distal and spaced apart from one another in respective ones of said holder wells; and thermoforming a plastic sheet over said mold and said upstanding vertical columns.

21. The method of claim 20, wherein the upstanding vertical columns are each independently formed and separately positioned without contacting one another in said holder wells.